United States Patent
Noh et al.

(10) Patent No.: US 10,110,050 B2
(45) Date of Patent: Oct. 23, 2018

(54) CORDLESS CHARGING APPARATUS

(71) Applicant: Samsung Electronics Co., Ltd., Gyeonggi-do (KR)

(72) Inventors: Yun-Jeong Noh, Gyeonggi-do (KR); Ki-Hyun Kim, Gyeonggi-do (KR); Woo-Ram Lee, Gyeonggi-do (KR); Kyoung-Won Kim, Seoul (KR); Jin-Yong Lee, Gyeonggi-do (KR); Min-Hwa Jeong, Gyeonggi-do (KR); Jong-Chul Hong, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 24 days.

(21) Appl. No.: 15/361,635

(22) Filed: Nov. 28, 2016

(65) Prior Publication Data

US 2017/0229899 A1    Aug. 10, 2017

(30) Foreign Application Priority Data

Feb. 5, 2016 (KR) .................. 10-2016-0015181

(51) Int. Cl.
*H02J 7/02* (2016.01)
*H02J 50/05* (2016.01)
*H02J 50/12* (2016.01)

(52) U.S. Cl.
CPC ............. *H02J 7/025* (2013.01); *H02J 50/05* (2016.02); *H02J 50/12* (2016.02)

(58) Field of Classification Search
CPC ............. H02J 7/025; H02J 50/12; H02J 50/05
USPC .......................................... 320/108
See application file for complete search history.

(56) References Cited

U.S. PATENT DOCUMENTS

| | | | |
|---|---|---|---|
| 9,355,766 B2* | 5/2016 | Han et al. | H01F 5/04 |
| 9,496,082 B2* | 11/2016 | Park et al. | H01F 27/34 |
| 9,735,606 B2* | 8/2017 | Koyanagi et al. | H02J 7/025 |
| 9,743,565 B2* | 8/2017 | Van Den Brink et al. | H05K 9/0049 |
| 9,837,829 B2* | 12/2017 | Park et al. | H02J 5/005 |
| 2017/0201114 A1* | 7/2017 | Chang | H02J 7/025 |

* cited by examiner

*Primary Examiner* — Sun Lin
(74) *Attorney, Agent, or Firm* — Cha & Reiter, LLC.

(57) ABSTRACT

A cordless charging apparatus includes a housing, a main substrate accommodated in the housing, a coil unit stacked on the main substrate, and a connection member for electrically connecting the coil unit to the main substrate. The connection member includes a connector provided on the main substrate, and a connection substrate provided at the coil unit in order to contact the connector and electrically connect with the coil unit stacked on the main substrate.

16 Claims, 7 Drawing Sheets

|  | CONVENTIONAL | EMBODIMENT |
|---|---|---|
| LENGTH OF COIL END PORTIONS | 20.00mm | 4.00mm |
| RESISTANCE AT COIL END PRTIONS DURING CHARGING | 0.68Mohm | 0.52Mohm |
| CHARGING EFFICIENCY | 74.00% | 73.95% |
| PICTURE OF REAL COIL END PORTIONS |  |  |

CORDLESS CHARGING APPARATUS

CLAIM OF PRIORITY

This application claims the benefit under of priority 35 U.S.C. § 119(a) from a Korean patent application filed in the Korean Intellectual Property Office on Feb. 5, 2016 and assigned Serial No. 10-2016-0015181, the entire disclosure of which is incorporated herein by reference.

BACKGROUND

Field of the Disclosure

The present disclosure relates generally to a cordless charging apparatus, and more particularly, to a cordless charging apparatus with a simplified structure in order to facilitate an electrical connection.

Description of the Related Art

An electronic device may be equipped with a battery for supplying power. Many techniques for recharging a battery have been developed. Recently, apparatuses for recharging a battery wirelessly (or in a contactless manner) have been proposed. Wireless charging (or contactless charging) may suitable for battery charging in an electronic device having a rechargeable battery. The wireless charging technology may operate via wireless power transmission and reception. For example, a battery of an electronic device may be charged automatically simply by placing the electronic device on a charging pad, without connecting a charger to the electronic device by means of a charging connector.

For example, a cordless charging apparatus can wirelessly transferring energy to a load by converting electrical energy to electromagnetic waves, without using a transmission line. Magnetic induction is widely used for cordless charging apparatuses. A cordless charging apparatus operating by magnetic induction transfers power using a magnetic field induced in a coil. For example, the cordless charging apparatus supplies energy to a load by flowing induced current through a reception coil using a magnetic field generated from current flowing through a transmission coil.

The cordless charging apparatus may include a transmitter power supply, a wireless charging transmitter, and a wireless charging receiver. The cordless charging apparatus may be part of an electronic device charged by it. The transmitter power supply may supply power by converting alternating current power to direct current (DC) power. The wireless charging transmitter may transmit power through the transmission coil by receiving the DC power and converting the DC power to alternating current (AC) power. The wireless charging receiver may generate DC power of a predetermined magnitude by receiving the AC power from the transmission coil through a reception coil and converting the AC power to DC power. The electronic device may be charged by receiving rectified DC power from the receiver.

In the process of fabricating the cordless charging apparatus, the transmission coil may be assembled with a substrate by soldering in such a manner that the transmission coil may be connected electrically to the substrate.

Specifically, the transmission coil may include a wound coil portion, and a coil end portion connected electrically to the substrate by, for example, soldering. In order to electrically connect the coil end portion to the substrate, the substrate is placed in a housing, the coil is stacked on the substrate, and then the coil end portion is soldered to the substrate. During the soldering, high-temperature heat may melt the injection-molded housing around a soldering point, thus deforming the housing.

For the soldering, the coil end portion should be deformed toward the substrate. However, since the coil of the wireless charging transmitter is not formed of a soft material, the coil end portion is not easy to bend, and cold soldering may cause failure.

Moreover, the soldering task requires various processing tools such as a soldering jig, a soldering iron, and lead. An assembly process is also required for the soldering task.

If a connector is used to connect the substrate to the coil end portion, loss may occur to a power line, thereby decreasing wireless charging efficiency.

The above information is presented as background information only to assist with an understanding of the present disclosure. No determination has been made, and no assertion is made, as to whether any of the above might be applicable as prior art with regard to the present disclosure.

SUMMARY

An aspect of the present disclosure is to address at least some of the above-mentioned problems and/or disadvantages and to provide at least some of the advantages described below. Accordingly, an aspect of the present disclosure provides a cordless charging apparatus which simplifies an assembly process, obviating the need for a soldering process for connecting a coil end portion to a substrate, and enables simple and easy electrical connection between the substrate and the coil end portion.

In accordance with an aspect of the present disclosure, there is provided a cordless charging apparatus. The cordless charging apparatus may include a housing, a main substrate accommodated in the housing, a coil unit stacked onto the main substrate, and a connection member that provides an electrical connection of the coil unit to the main substrate. The connection member includes a connector provided on the main substrate, and a connection substrate provided at the coil unit that contacts the connector and electrically connects the coil unit to the main substrate.

Other aspects, advantages, and salient features of the disclosure will become better understood by those skilled in the art from the following detailed description, which, taken in conjunction with the annexed drawings, discloses non-limiting exemplary embodiments of the disclosure.

BRIEF DESCRIPTION OF THE DRAWINGS

The application file contains at least one drawing executed in color. Copies of this patent or patent application publication with color drawing(s) will be provided by the Office upon request and payment of the necessary fee.

The above and other aspects, features and advantages of certain exemplary embodiments of the present disclosure will be better-appreciated from the following description taken in conjunction with the accompanying drawings, in which.

Throughout the drawings, like reference numerals will be understood to refer to like parts, components, and structures.

DETAILED DESCRIPTION

Figure 1:
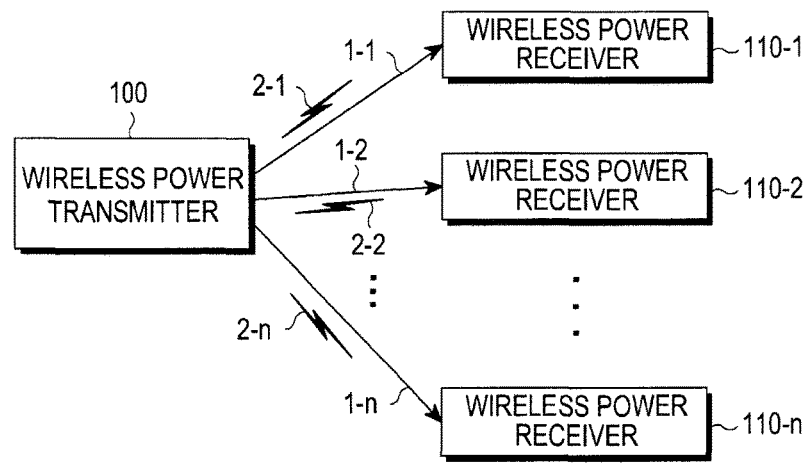
FIG. 1 is a conceptual view illustrating an overall operation of a wireless charging system.

Various embodiments of the present disclosure are described with reference to the accompanying drawings. However, the scope of the present disclosure is not intended to be limited to the particular embodiments provided herein for illustrative purposes, and it is to be understood that the present disclosure covers all modifications, equivalents, and/or alternatives falling within the scope and spirit of the present disclosure. In relation to a description of the drawings, like reference numerals denote the same components.

In the present disclosure, the term 'have', 'may have', 'include', or 'may include' signifies the presence of a specific feature (for example, number, function, operation, or part), not excluding the presence of addition of one or more other features.

In the present disclosure, the term 'A or B', 'at least one of A or/and B', or 'one or more of A or/and B' may cover all possible combinations of enumerated items. For example, 'A or B', 'at least one of A and B', or 'at least one of A or B' may represent all of the cases of (1) inclusion of at least one A, (2) inclusion of at least one B, and (3) inclusion of at least one A and at least one B.

The term as used in the present disclosure, 'first' or 'second' may modify the names of various components irrespective of sequence and/or importance, not limiting the components. These expressions may be used to distinguish one component from another component. For example, a first user equipment (UE) and a second UE may indicate different UEs irrespective of sequence or importance. For example, a first component may be referred to as a second component and vice versa without departing the scope of the present disclosure.

When it is said that a component (for example, a first component) is 'operatively or communicatively coupled with/to' or 'connected to' another component (for example, a second component), it should be understood that the one component is connected to the other component directly or through another component (for example, a third component). On the other hand, when it is said that a component (for example, a first component) is 'directly connected to' or 'directly coupled to' another component (for example, a second component), it may be understood that there is no other component (for example, a third component) between the components.

The term 'configured to' as used in the present disclosure may be replaced with, for example, the term 'suitable for', 'designed to', 'adapted to', 'made to' under the circumstances and context used. The term 'configured to' may not necessarily mean 'specifically designed to' in hardware. Instead, the term 'configured to' may mean that a device may mean 'capable of' with another device or part. For example, 'a processor configured to execute A, B, and C' may mean a dedicated processor (for example, an embedded processor) for performing the corresponding operations or a generic-purpose processor (for example, a central processing unit (CPU) or an application processor (AP)) for performing the corresponding operations.

The terms as used in the present disclosure are provided to describe specific embodiments, and it is to be understood that the specific embodiments do not limit the scope of other embodiments. It is to be understood that singular forms include plural references unless the context clearly dictates otherwise. The terms and words including technical or scientific terms used in the following description and claims may have the same meanings as generally understood by those skilled in the art. The terms as generally defined in dictionaries may be interpreted as having the same or similar meanings as or to contextual meanings of related technology. Unless otherwise defined, the terms should not be interpreted as having ideally or excessively formal meanings. When needed, even the terms as defined in the present disclosure may not be interpreted as excluding embodiments of the present disclosure.

According to various embodiments of the present disclosure, an electronic device may be at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MPEG-1 audio layer-3 (MP3) player, a mobile medical equipment, a camera, or a wearable device. According to various embodiments of the disclosure, the wearable device may be at least one of an accessory type (for example, a watch, a ring, a bracelet, an ankle bracelet, a necklace, glasses, contact lenses, or a head-mounted device (HMD)), a fabric or clothes type (for example, electronic clothes), a body-attached type (for example, a skin pad or a tattoo), and an implantable type (for example, an implantable circuit).

According to some embodiments of the disclosure, an electronic device may be a home appliance. The home appliance may include at least one of, for example, a television (TV), a digital versatile disk (DVD) player, an audio player, a refrigerator, an air conditioner, a vacuum cleaner, an oven, a microwave oven, a washer, an air purifier, a set-top box, a home automation control panel, a security control panel, a TV box (for example, Samsung HomeSync™, Apple TV™, Google TV™, or the like), a game console (for example, Xbox™, PlayStation™, or the like), an electronic dictionary, an electronic key, a camcorder, or an electronic picture frame.

According to other embodiments of the disclosure, an electronic device may comprise at least one of a medical device (for example, a portable medical meter such as a blood glucose meter, a heart rate meter, a blood pressure meter, or a body temperature meter, a magnetic resonance angiography (MRA) device, a magnetic resonance imaging (MRI) device, a computed tomography (CT) device, an imaging device, an ultrasonic device, or the like), a navigation device, a global navigation satellite system (GNSS), an event data recorder (EDR), a flight data recorder (FDR), an automotive infotainment device, a naval electronic device (for example, a naval navigation device, a gyrocompass, or the like), an avionic electronic device, a security device, an in-vehicle head unit, an industrial or consumer robot, an automatic teller machine (ATM) in a financial facility, a point of sales (POS) device in a shop, an Internet of Things (IoT) device (for example, a lighting bulb, various sensors, an electricity or gas meter, a sprinkler, a fire alarm, a thermostat, a street lamp, a toaster, sports goods, a hot water tank, a heater, or a boiler), and the like.

According to some embodiments of the disclosure, an electronic device may be at least one of furniture, part of a building/structure, an electronic board, an electronic signature receiving device, a projector, and various measuring devices (for example, water, electricity, gas or electromagnetic wave measuring devices). According to various embodiments, an electronic device may be one or a combination of two or more of the foregoing devices. According to some embodiments, an electronic device may be embodied as a flexible electronic device. In addition, it will become apparent to one having ordinary skill in the art that an electronic device according to an embodiment of the present disclosure is not limited to the foregoing devices and covers a new electronic device produced along with technology development.

A description will first be given of the concept of a wireless charging system applicable to embodiments of the present disclosure with reference to FIGS. 1, 2 and 3.

FIG. 1 is a conceptual view illustrating an overall operation of a wireless charging system. Referring now to FIG. 1, the wireless charging system includes a wireless power transmitter (or power transmitting unit (PTU)) 100 and one or more wireless power receivers (or power receiving units (PRUs)) 110-1, 110-2, . . . , and 110-n.

The wireless power transmitter 100 may wirelessly transmit power 1-1, 1-2, . . . , and 1-n respectively to the wireless power receivers 110-1, 110-2, . . . , and 110-n. More specifically, the wireless power transmitter 100 may wirelessly transmit the power 1-1, 1-2, . . . , and 1-n only to wireless power receivers that have been authenticated in a predetermined authentication procedure.

The wireless power transmitter 100 may establish electrical connections to the wireless power receivers 110-1, 110-2, . . . , and 110-n. For example, the wireless power transmitter 100 may transmit wireless power in the form of electromagnetic waves to the wireless power receivers 110-1, 110-2, . . . , and 110-n.

The wireless power transmitter 100 may conduct bi-directional communications with the wireless power receivers 110-1, 110-2, . . . , and 110-n. The wireless power transmitter 100 and the wireless power receivers 110-1, 110-2, . . . , and 110-n may process or transmit/receive packets 2-1, 2-2, . . . , and 2-n configured in predetermined frames. The wireless power receivers may also be configured particularly as mobile communication terminals, PDAs, PMPs, smartphones, or the like.

The wireless power transmitter 100 may supply power wirelessly to the plurality of wireless power receivers 110-1, 110-2, . . . , and 110-n. For example, the wireless power transmitter 100 may transmit power to the plurality of wireless power receivers 110-1, 110-2, . . . , and 110-n by a resonance scheme. If the wireless power transmitter 100 adopts the resonance scheme, the distances between the wireless power transmitter 100 and the wireless power receivers 110-1, 110-2, . . . , and 110-n may be preferably 30 m or smaller. If the wireless power transmitter 100 adopts an electromagnetic induction scheme, the distances between the wireless power transmitter 100 and the wireless power receivers 110-1, 110-2, . . . , and 110-n may be preferably 10 cm or smaller.

The wireless power receivers 110-1, 110-2, . . . , and 110-n may receive wireless power from the wireless power transmitter 100 and charge their internal batteries. Further, the wireless power receivers 110-1, 110-2, . . . , and 110-n may transmit to the wireless power transmitter 100 a signal requesting wireless power transmission, information required for wireless power reception, wireless power receiver state information, or control information for the wireless power transmitter 100.

Each of the wireless power receivers 110-1, 110-2, . . . , and 110-n may also transmit a message indicating its charged state to the wireless power transmitter 100.

The wireless power transmitter 100 may include a display means such as a display and may display the state of each wireless power receiver based on the messages received from the wireless power receivers 110-1, 110-2, . . . , and 110-n. Further, the wireless power transmitter 100 may display a time expected until each of the wireless power receivers 110-1, 110-2, . . . , and 110-n is completely charged.

The wireless power transmitter 100 may transmit a control signal for disabling a wireless charging function to the wireless power receivers 110-1, 110-2, . . . , and 110-n. Upon receipt of the control signal for disabling the wireless charging function from the wireless power transmitter 100, a wireless power receiver may disable the wireless charging function.

Figure 2:
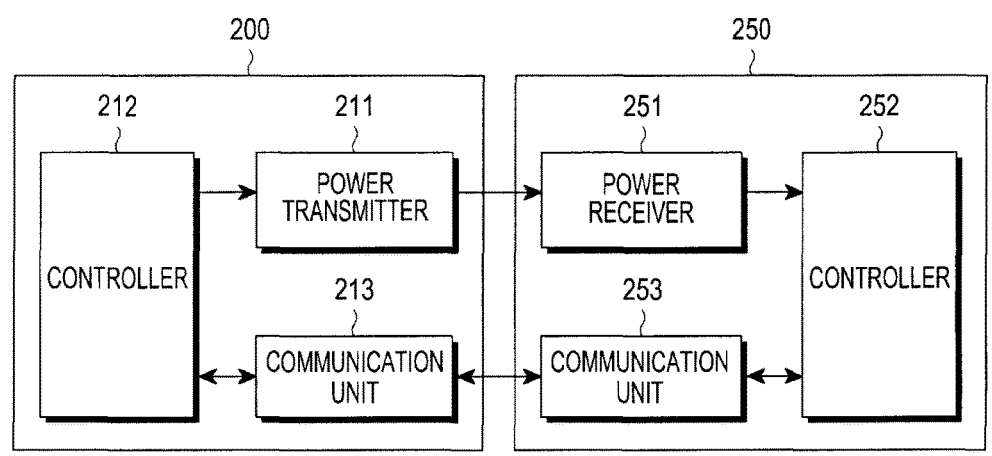
FIG. 2 is a block diagram illustrating a wireless power transmitter and a wireless power receiver according to an embodiment of the present disclosure.

FIG. 2 is a block diagram illustrating a wireless power transmitter and a wireless power receiver according to an embodiment of the present disclosure.

Referring now to FIG. 2, a wireless power transmitter 200 may include a power transmitter 211, a controller 212, which includes hardware such as integrated circuits configured for operation, and a communication unit 213. A wireless power receiver 250 may include a power receiver 251, a controller 252 which includes hardware such as integrated circuits configured for operation, and a communication unit 253.

The power transmitter 211 includes hardware that may supply power required for the wireless power transmitter 200 and may wirelessly supply power to the wireless power receiver 250. The power transmitter 211 may supply power in the form of alternating Current (AC) waveforms, or convert power in direct current (DC) waveforms to power in AC waveforms by an inverter and then supplies power in the AC waveforms. The power transmitter 211 may be implemented as a built-in battery. Or the power transmitter 211 may be implemented as a power reception interface so as to receive power from the outside and supply the power to other components. It will be understood to those skilled in the art that as far as it can supply power in AC waveforms, various forms of hardware may be used as the power transmitter 211.

Further, the power transmitter 211 may provide AC waveforms in the form of electromagnetic waves to the wireless power receiver 250. The power transmitter 211 may further include a resonant circuit and thus transmit or receive predetermined electromagnetic waves. If the power transmitter 211 is configured as a resonant circuit, the inductance L of a loop coil of the resonant circuit may be variable. Meanwhile, as far as it can transmit and receive electromagnetic waves, any means may be used as the power transmitter 211.

The controller 212 may be configured to provide overall control to the wireless power transmitter 200. The controller 212 includes one or more integrated circuits that may control an overall operation of the wireless power transmitter 200 using an algorithm, a program, or an application required for a control operation, read from a storage unit (not shown). The controller 212 may be configured as a CPU, a microprocessor, or a mini computer.

The communication unit 213 may communicate with the wireless power receiver 250 in a predetermined communication scheme. The communication unit 213 includes hardware (such as a transmitter, receiver, or transceiver) to transmit and receive communications and may communicate with the wireless power receiver 250 by near field communication (NFC), Zigbee communication, infrared communication, visible ray communication, Bluetooth (BT) communication, Bluetooth low energy (BLE) communication, or the like. The communication unit 213 may use a carrier sense multiple access/collision avoidance (CSMA/CA) algorithm. The above-described communication schemes are purely exemplary and embodiments of the present disclosure are not limited to a specific communication scheme performed in the communication unit 213.

The communication unit 213 may transmit an information signal regarding the wireless power transmitter 200. The communication unit 213 may unicast, multicast, or broadcast the signal.

Also, with continued reference to FIG. 2, the communication unit 213 may receive power information from the wireless power receiver 250. The power information may include information about at least one of the capacity, residual battery amount, use amount, battery capacity, and battery proportion of the wireless power receiver 250.

Further, the communication unit 213 of the power transmitter 200 may transmit a charging function control signal for controlling the charging function of the specific wireless power receiver 250. The charging function control signal may be a control signal that enables or disables the charging function by controlling the wireless power receiver 251 of the specific wireless power receiver 250. Or the power information may include information about insertion of a wired charging terminal, transition from a stand alone (SA) mode to a non-stand alone (NSA) mode, error state release, and the like.

The communication unit 213 may receive a signal from another wireless power transmitter (not shown) as well as the wireless power receiver 250. For example, the communication unit 213 may receive a Notice signal (i.e. notification signal) from another wireless power transmitter.

While the power transmitter 211 and the communication unit 213 are shown in FIG. 2 as different hardware units and thus the wireless power transmitter 200 conducts communication in an out-band manner, this operation is exemplary. The present disclosure may be implemented such as the power transmitter 211 and the communication unit 213 are incorporated into a single hardware unit and thus the wireless power transmitter conducts communication in an in-band manner.

With continued reference to FIG. 2, the wireless power transmitter 200 and the wireless power receiver 250 may transmit and receive various signals. Accordingly, the wireless power receiver 250 may subscribe to a wireless power network managed by the wireless power transmitter 200 and charging may be performed by wireless power transmission and reception between the wireless power transmitter 200 and the wireless power receiver 250.

Figure 3:
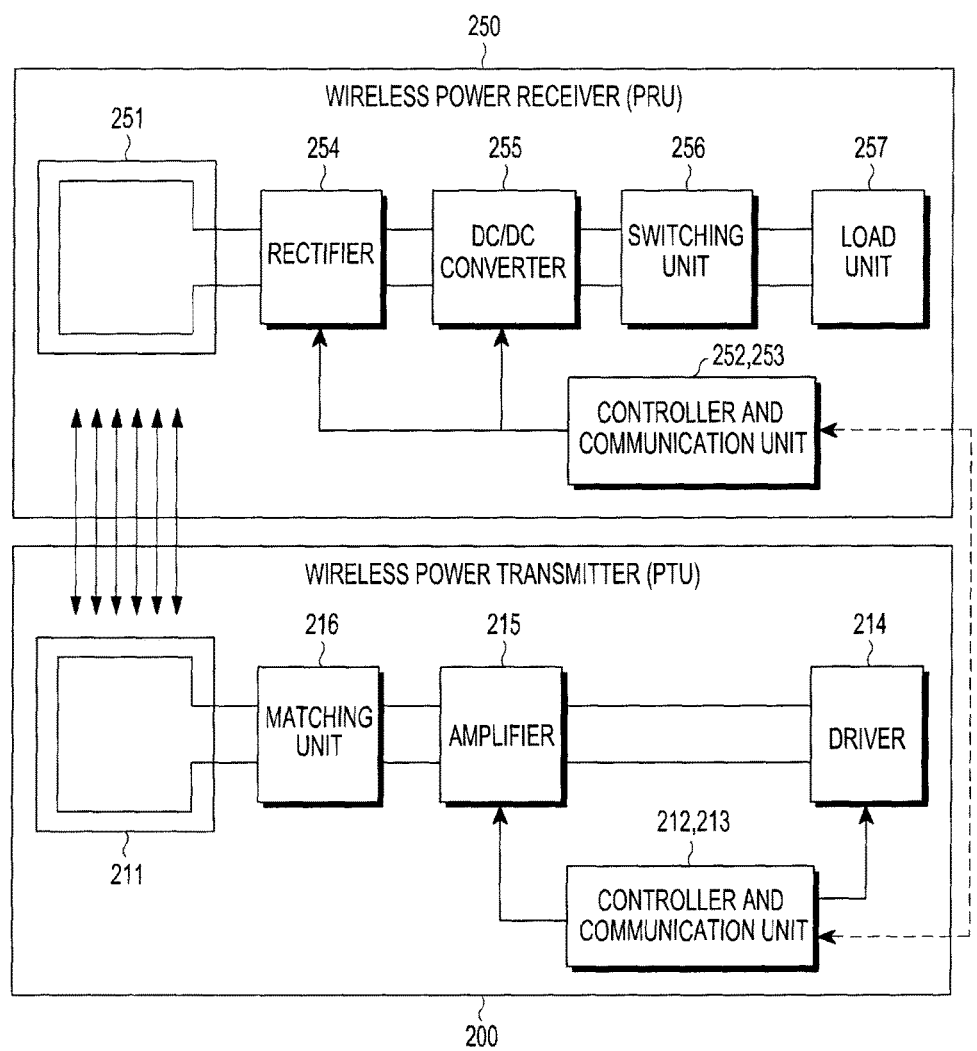
FIG. 3 is a detailed block diagram illustrating the wireless power transmitter and the wireless power receiver according to an embodiment of the present disclosure.

FIG. 3 is a detailed block diagram illustrating the wireless power transmitter and the wireless power receiver according to an embodiment of the present disclosure.

Referring to FIG. 3, the wireless power transmitter 200 may include the power transmitter 211, the controller and communication unit 212 and 213, a driver 214, an amplifier 215, and an impedance matching unit 216. The wireless power receiver 250 may include the power receiver 251, the controller and communication unit 252 and 253, a rectifier 254, a DC/DC converter 255, a switching unit 256, and a load unit 257.

The driver 214 may output DC power having a predetermined voltage value. The voltage value of the DC power output from the driver 214 may be controlled by the controller and communication unit 212 and 213.

A DC current output from the driver 214 may be applied to the amplifier 215. The amplifier 215 may amplify the DC current with a predetermined gain. Further, the amplifier 215 may convert DC power to AC power based on a signal received from the controller and communication unit 212 and 213. Therefore, the amplifier 215 may output the AC power.

The impedance matching unit 216 may perform impedance matching. For example, the impedance matching unit 216 may control impedance viewed from the matching unit 216 so that its output power may have high efficiency or high power. The impedance matching unit 216 may adjust impedance under the control of the controller and communication unit 212 and 213. The impedance matching unit 216 may include at least one of a coil and a capacitor. The controller and communication unit 212 and 213 may control a connection state to at least one of the coil and the capacitor so that impedance matching may be performed according to the controlled connection state.

The power transmitter 211 may transmit input AC power to the power receiver 251. The power transmitter 211 and the power receiver 251 may be configured as resonant circuits having the same resonant frequency. For example, the resonant frequency may be determined to be 6.78 MHz.

The controller and communication unit 212 and 213 may communicate with the controller and communication unit 252 and 253 of the wireless power receiver 250, for example, bi-directionally in 2.4 GHz (by wireless fidelity (WiFi), ZigBee, or BT/BLE).

The power receiver 251 may receive charging power.

The rectifier 254 may rectify wireless power received from the power receiver 251 to DC power. For example, the rectifier 254 may be configured as a bridge diode. The DC/DC converter 255 may convert the rectified power with a predetermined gain. For example, the DC/DC converter 255 may convert the rectified power so that the voltage of its output end may be 5V. A minimum voltage value and a maximum voltage value that may be applied to an input end of the DC/DC converter 255 may be preset.

The switching unit 256 may connect the DC/DC converter 255 to the load unit 257. The switching unit 256 may be kept in an on or off state under the control of the controller 252. If the switching unit 256 is in the on state, the load unit 257 may store the converted power received from the DC/DC converter 255.

Figure 4:
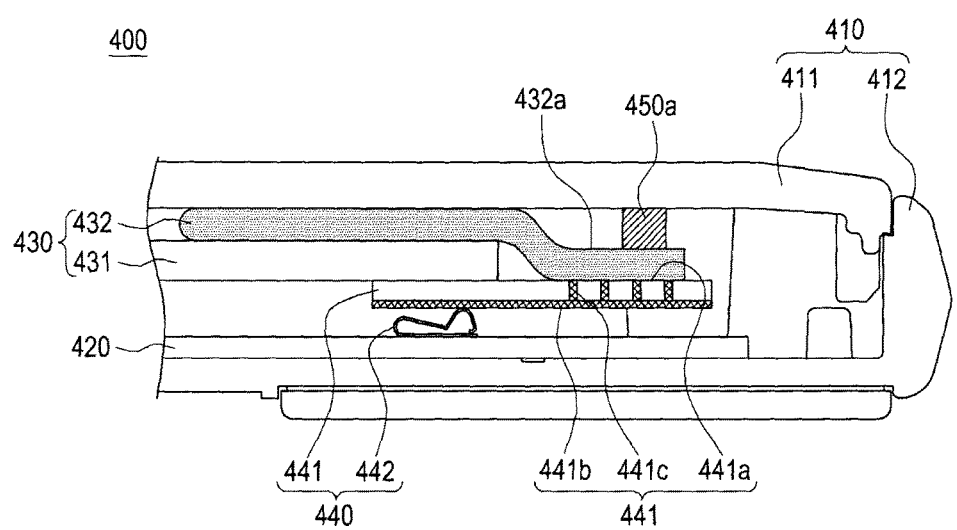
FIG. 4 is a sectional view illustrating a cordless charging apparatus according to various embodiments of the present disclosure.
Figure 5:
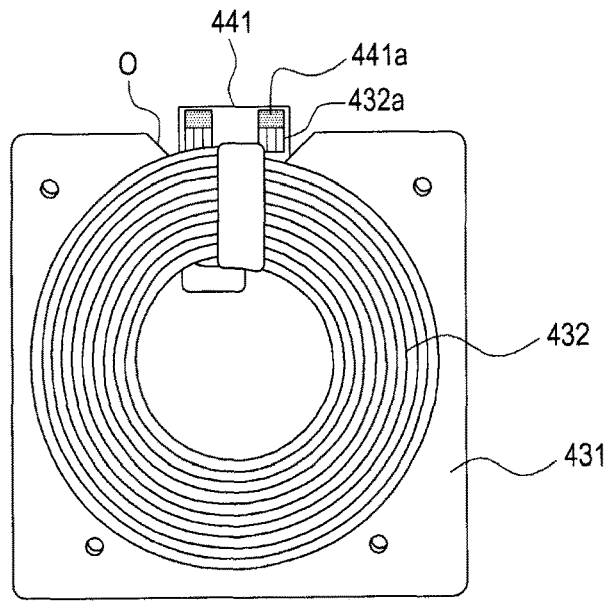
FIG. 5 is a view illustrating one surface of a coil unit in a cordless charging apparatus according to various embodiments of the present disclosure.

FIG. 4 is a sectional view illustrating a cordless charging apparatus according to various embodiments of the present disclosure, and FIG. 5 is a view illustrating one surface of a coil unit 430 in the cordless charging apparatus 400 according to various embodiments of the present disclosure.

Figure 6:
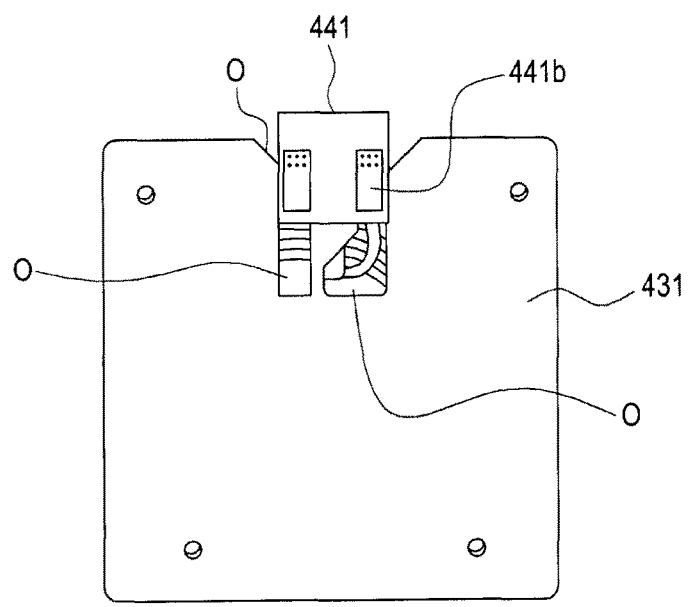
FIG. 6 is a view illustrating the other surface of the coil unit in a cordless charging apparatus according to various embodiments of the present disclosure.
Figure 7A:
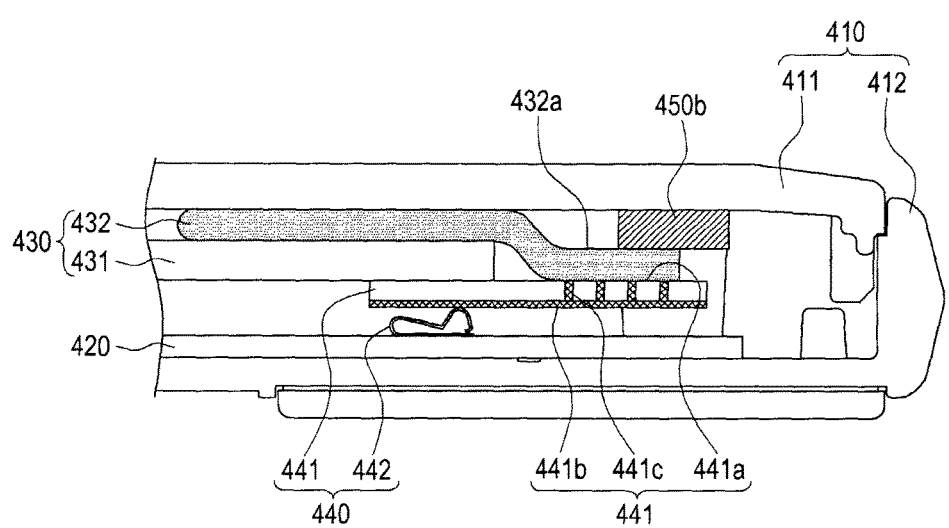
FIG. 7A is a sectional view illustrating a cordless charging apparatus according to various embodiments of the present disclosure.

FIG. 6 is a view illustrating the other surface of the coil unit 430 in the cordless charging apparatus 400 according to various embodiments of the present disclosure, and FIG. 7A is a sectional view illustrating the cordless charging apparatus 400 according to various embodiments of the present disclosure.

Referring to FIGS. 4 to 7A, the cordless charging apparatus 400 according to various embodiments of the present disclosure is an apparatus for wirelessly charging a battery inside an electronic device, for example, a mobile communication terminal, a PDA, a PMP, or a smartphone, when the electronic device is placed on the apparatus. To supply power to the electronic device, the cordless charging apparatus 400 may include a housing 410, a main substrate 420, the coil unit 430, and a connection member 440 for electrically connecting the coil unit 430 to the main substrate 420. The main substrate 420, the coil unit 430, and the connection member 440 reside inside the housing 410.

The housing 410 may include an upper case 411 and a lower case 412. When the lower case 412 is engaged with the upper case 411, a space may be defined inside the housing 410, in which the above-described parts, for example, the coil unit 430, the main substrate 420, and the connection member 440 may be arranged. Regarding a mounting structure of the cordless charging apparatus 400, the main substrate 420 and the coil unit 430 may be mounted sequentially in the lower case 412, and the upper case 411 may be engaged with the lower case 412 from above the lower case 412, covering the space. In this manner, the cordless charging apparatus 400 may be assembled.

The housing 410 may further include pressurizers 450a and 450b for, when the lower case 412 is engaged with the upper case 411, pressing the connection member 440 and thus increasing the reliability of the electrical contact between the coil unit 430 and the main substrate 420.

The pressurizers 450a and 450b may also be provided to increase the reliability of contact of the connection member 440 which will be described herein after. More specifically, the pressurizers 450a and 450b may be provided to press the later-described connection member 440, for example, press a connection substrate 441 to a connector 442 and maintain contact between the connection substrate 441 and the connector 442. Further, to press the connection substrate 441 to the connector 442 along with engagement of the housing 410, the pressurizers 450a and 450b may be interposed between the upper case 411 and the connection substrate 441.

According to an embodiment of the disclosure, the pressurizers 450a and 450b may be configured as protrusions (see the protrusion 450a in FIG. 4) which protrude from the inner surface of the upper case 411 toward the connection substrate 441. If the pressurizers 450a and 450b are configured as protrusions, when the coil unit 430 to which the connector 442 is installed is mounted on the main substrate 420 on which the connector 442 is installed and then the upper case 411 is engaged with the lower case 412, the pressurizers 450a and 450b may press the connection substrate 441 onto the connector 442, and the connector substrate 441 may be kept in constant contact with the connector 442.

According to an embodiment of the disclosure, the pressurizers 450a and 450b may be configured as elastic plates (see the elastic plate 450b in FIG. 7A) interposed between the inner surface of the upper case 411 and the connection substrate 441. If the pressurizers 450a and 450b are configured as elastic plates, when the coil unit 430 to which the connector 442 is installed is mounted on the main substrate 420 on which the connector 442 is installed and then the upper case 411 is engaged with the lower case 412, the connection substrate 441 may be pressed to the connector 442 with a specific elastic force of the elastic plates 450a and 450b between the upper case 411 and the connection substrate 441, and the connection substrate 441 may be kept in constant contact with the connector 442.

The main substrate 420 may be a printed circuit board (PCB), and while not shown, at least one dielectric layer and at least one metal layer may be stacked on the main substrate 420. The main substrate 420 may be placed inside the housing 410, for example, the lower case 412, and wireless charging parts, a controller, and other devices may be mounted on the main substrate 420.

The coil unit 430 may include at least one coil 432 and a shielding member 431, and the coil unit may be stacked on the main substrate 420.

The coil 432 may be provided to be supportedly placed on the shielding member 431 and wound in one direction on the shielding member 431. Coil end portions 432a of the coil 432 may protrude to a predetermined length from one side of the shielding member 431, so as to be engaged at a predetermined position with the main substrate 420, specifically the connection substrate 441 provided for electrical connection between the coil end portions 432a and the main substrate 420.

The coil end portions 432a may be electrically coupled with the connection substrate 441, specifically on subsequently-described engagement portions 441a. Herein, with the coil 432 mounted on the shielding member 431, the coil end portions 432a may be electrically connected to the connection member 440 by soldering. Further, when the coil end portions 432a are electrically connected to the engagement portions 441a, the coil end portions 432a may not be bent or may be bent a little, and may have a short length, relative to conventional coil end portions. In other words, if the conventional coil end portions should be about 20 mm long so as to facilitate connection to the main substrate 420, the coil end portions 432a may be about 4.0 mm long in the present disclosure. The lengths discussed herein implies that the length of the coil end portions 432a in the present disclosure may be about ⅕ of the length of the conventional coil end portions, required for connection to the main substrate 420. If a length from the connector 442 to the coil end portions 432a is shortened as described above, metal resistance generated from the connector 442 to the coil end portions 432a may be minimized, compared to the conventional technology, and loss on a power line caused by electrical connection through the connector 442 may be compensated for. As a consequence, degradation of charging efficiency may be prevented.

The shielding member 431 may be provided to, when power is supplied to the coil 432, shield a magnetic field generated by noise or eddy current so that the coil 432 may operate stably. The shielding member 431 may be configured as a film or plate and formed of a material with high permeability and low loss.

The coil 432 may be mounted on one surface of the shielding member 431, and the connection substrate 441 may be mounted on the other surface of the shielding member 431 to electrically connect the coil 432 to the main substrate 420. As described later, in the state where one surface of the connection substrate 441 is engaged with the other surface of the shielding member 431 and the coil end portions 432a are electrically connected to the one surface of the connection substrate 441, the other surface of the connection substrate 441 should contact the connector 442 on the main substrate 420 and should be kept in contact with the connector 442. For this purpose, the connection substrate 441 should be pressed to the connector 442 with a predetermined force. The shielding member 431 or the connection substrate 441 may be provided as a plate. The connection substrate 441 may be pressed to the connector 442 to the same extent. Thus, to keep the connection substrate 441 in contact with the connector 442, the connection substrate 441 should be installed to have certain elasticity against pressure. Accordingly, a chamfered opening having a predetermined width may be formed at a position at which the connection substrate 441 is installed to the shielding member 431, specifically at a position at which the shielding member 431 overlaps with the connection substrate 441.

According to an embodiment of the present disclosure, the connection member 440 may include the connector 442 and the connection substrate 441.

The connector 442 may protrude on the main substrate 420. According to an embodiment, the connector 442 may be a C-clip, by way of example. Or the connector 442 may be a conductive elastic member according to an embodiment. For example, the connector 442 may be formed of a mixture of metal powder such as copper or silver and a resin such as epoxy, polyester, or melamine, or the same material as used for a conductive spring. Any material capable of forming an electrical connection may be available for formation of the connector 442.

If the connector 442 is engaged on the main substrate 420, the later-described connection substrate 441 is engaged with the coil unit 430, and then the coil unit 430 is placed on the main substrate 420, the connection substrate 441 may be stacked on the connector 442, contacting the connector 442.

The connection substrate 441 may be mounted on the other surface of the coil unit 430, specifically the shielding member 431, and the coil end portions 432a may be placed on one surface of the connection substrate 441 through the chamfered opening. Also, the connection substrate 441 may be provided to function as an intermediate connection unit that allows electrical connection of the coil end portions 432a to the main substrate 420, at the position of the chamfered opening.

The connection substrate 441 may include the engagement portions 441a, contacts 441b, and via holes 441c to electrically connect the coil end portions 432a on the one surface of the connection substrate 441 to the connector 442 that contacts the other surface of the connection substrate 441.

The engagement portions 441a may be provided on the one surface of the connection substrate 441 and electrically connected to the coil end portions 432a. In an embodiment, the coil end portions 432a may be electrically connected to the engagement portions 441a by soldering.

The contacts 441b are structures directly contacting the connector 442, which are provided on the other surface of the connection substrate 441 and electrically connected to the engagement portions 441a through the via holes 441c.

Thus, the coil end portions 432a may be electrically connected to the connector 442 through the engagement portions 441a, the contacts 441b, and the via holes 441c.

Further, with continued reference to FIG. 4, since the engagement portions 441a of the connection substrate 441 may be engaged with the coil end portions 432a, exposed through the chamfered opening of the shielding member 431, the length of the coil end portions 432a may be minimized, and the coil end portions 432a may be electrically connected to the engagement portions 441a by being bent to a less extent or without being bent.

As noted from [Table 1] below, loss on a power line, which may be caused by electrical connection through the connector 442, may be compensated for by minimizing a distance between the connector 442 and the coil end portions 432a, and thus minimizing metal resistance. As a consequence, the decrease of charging efficiency may be minimized, while conventional charging efficiency is maintained.

Figure 7B:
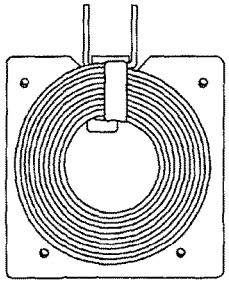
FIG. 7B is a photo of real coil end portions of the conventional (left image) and according to an embodiment of the disclosure (right image)
Figure 7B:
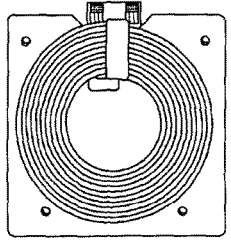

For example, the conventional coil end portions should be bent and 20 mm long to contact the main substrate 420 as illustrated in [Table 1]. In this case, resistance generated at the coil end portions may be higher than the resistance of the coil 432 according to the embodiment of the present disclosure. On the other hand, since the coil unit 430 is connected to the main substrate 420 through the connector 442, loss may occur to a power line at the connector 442 in the present disclosure. However, the length of the coil end portions 432a may be about ⅕ of the length of the conventional coil end portions, for connection between the coil unit 430 and the main substrate 420, thereby reducing metal resistance generated at the coil end portions 432a during charging in the present disclosure. Furthermore, the connector 442 may be in contact with the contacts 441b over a large sectional area. Accordingly, if charging is performed under the same conditions, the conventional wireless charging efficiency of the cordless charging apparatus 400 may be kept unchanged in the present disclosure. FIG. 7B shows a photo of a conventional coil end (left image) and a coil end according to an embodiment of the disclosure (right image).

TABLE 1

|  | Conventional | Embodiment |
| --- | --- | --- |
| Length of coil end portions | 20.00 mm | 4.00 mm |
| Resistance at coil end portions during charging | 0.68 Mohm | 0.52 Mohm |
| Charging efficiency | 74.00% | 73.95% |

Figure 8:
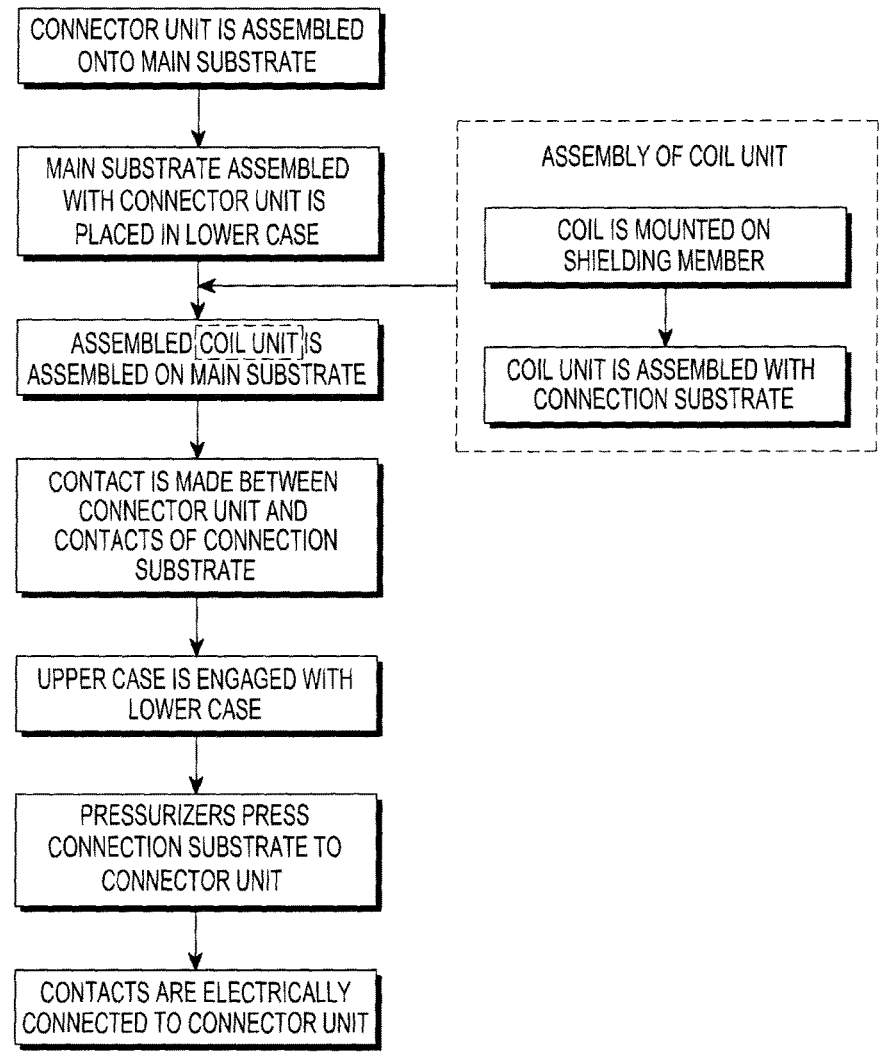
FIG. 8 is a flowchart illustrating an operation for assembling a cordless charging apparatus according to various embodiments of the present disclosure.

FIG. 8 is a flowchart illustrating an operation for assembling a cordless charging apparatus according to various embodiments of the present disclosure.

Referring now to FIG. 8, a process for assembling the cordless charging apparatus 400 having the above-described configuration will be described.

First of all, the connector 442 may be assembled onto the main substrate 420. The main substrate 420 assembled with the connector 442 may be mounted in the lower case 412.

The coil unit 430 may be assembled separately from the assembly of the main substrate 420 with the connector 442. In the process of assembling the coil unit 430, the coil 432 may be mounted on the one surface of the shielding member 431 having the chamfered opening. Also, the coil end portions 432a may be mounted in the chamfered opening. The connection substrate 441 having the engagement portions 441a exposed may be engaged in the chamfered opening, on the other surface of the shielding member 431. The engagement portions 441a of the main substrate 420 may be electrically connected to the coil end portions 432a by soldering.

The coil unit 430 which has been assembled as described above may be mounted on the separately assembled main substrate 420. In other words, the main substrate 420 having the connector 442 mounted thereon may be placed in the lower case 412 and the coil unit 430 may be assembled on the main substrate 420.

When the coil unit 430 is assembled on the main substrate 420, the connector 442 may contact the contacts 441b of the connection substrate 441. When the upper case 411 is engaged on the lower case 412, the pressurizers 450a and 450b press the connection substrate 441 toward the main substrate 420. Therefore, the connection substrate 441 may be pressed elastically to the same extent through the chamfered opening by the shielding member 431, and the contacts 441b may be kept in contact with the connector 442. As described above, the coil end portions 432a may be electrically engaged with the main substrate 420 simply by engaging the lower case 412 with the upper case 411.

As is apparent from the foregoing description of the cordless charging apparatus according to various embodiments of the present disclosure, since the main substrate is electrically connected to the coil unit during assembly, there is no need for soldering for electrical connection between the main substrate and the coil unit. As a consequence, an assembly device for a soldering assembly is not needed, the assembly process can be simplified, and the assembly time of the cordless charging apparatus can be shortened.

Further, the main substrate can be easily separated from or engaged with the coil unit. Therefore, the main substrate and the coil unit can be readily replaced in the event of electrical disconnection or failure.

The apparatuses and methods of the disclosure can be implemented in hardware, and in part as firmware or via the execution of software or computer code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as by at least one processor, so that the methods described herein are loaded into hardware such as a general purpose computer, or a special processor or in programmable or dedicated hardware, such as an ASIC or FPGA.

As would be understood in the art, the computer, the processor, microprocessor, controller, control unit or the programmable hardware include memory components, e.g., RAM, ROM, Flash, etc., that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" "controller", or "control unit" constitute hardware in the claimed disclosure that contain circuitry, such as integrated circuitry, that is configured for operation. The control unit/controller may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc.

Under the broadest reasonable interpretation, the appended claims constitute statutory subject matter in compliance with 35 U.S.C. § 101 and none of the elements are software per se.

Nor are the claims directed to Abstract ideas, and constitute statutory subject matter under 35 U.S.C. § 101.

The definition of the terms "unit" or "module" as referred to herein are to be understood as constituting hardware circuitry such as a CCD, CMOS, SoC, AISC, FPGA, at least one processor or microprocessor (e.g. a controller or control unit) configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. § 101 and do not constitute software per se.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A cordless charging apparatus comprising:
   a housing;
   a main substrate arranged within the housing;
   a coil unit stacked on the main substrate; and
   a connection member configured to electrically connect the coil unit to the main substrate,
   wherein the connection member comprises:
   a connector provided on the main substrate; and
   a connection substrate provided at the coil unit that is in contact with the connector and electrically connects the coil unit to the main substrate.

2. The cordless charging apparatus of claim 1, wherein the housing comprises:
   a lower case that receives the main substrate and the coil unit; and
   an upper case that covers the main substrate and the coil unit in the lower case, and
   wherein a pressurizer is included in the housing and is configured to press the connection substrate onto the connector and to maintain a contact between the connection substrate and the connector.

3. The cordless charging apparatus of claim 2, wherein the pressurizer comprises a protrusion extending from an inner surface of the upper case toward the connection substrate.

4. The cordless charging apparatus of claim 3, wherein the pressurizer comprises an elastic plate disposed between the inner surface of the upper case and the connection substrate.

5. The cordless charging apparatus of claim 2, wherein the coil unit comprises:
   a coil; and
   a shielding member disposed between the coil and the main substrate to permit the coil to be mounted thereon.

6. The cordless charging apparatus of claim 5, wherein the shielding member includes a chamfered opening for connecting an end portion of the coil to the connection substrate, and for uniformly pressing the connection substrate to the connector along with pressing of the pressurizer.

7. The cordless charging apparatus of claim 1, wherein the connection substrate comprises:
   an engagement portion connected to an end portion of the coil unit on one surface of the connection substrate;
   a contact for electrically connecting the connector on another surface of the connection substrate; and
   a via hole for electrically connecting the engagement portion to the contact.

8. The cordless charging apparatus of claim 1, wherein the connector comprise a C-clip connector.

9. The cordless charging apparatus of claim 1, wherein the connector comprises a conductive elastic member.

10. The cordless charging apparatus of claim 1, wherein the connection between the main substrate and the coil unit is not soldered.

11. A wireless power transmitting device, comprising:
    a housing;
    a power transmitter arranged within the housing that includes:
    a main substrate;

a coil unit arranged in the housing and electrically connected to the main substrate; and a connection member that electrically couples the coil unit to the main substrate, wherein the power transmitter wirelessly transmits power to one or more wireless power receivers according to a resonance scheme.

12. The wireless power transmitting device according to claim 11, wherein a distance between the power transmitter and the at least one or more wireless power receivers is 30 meters or less.

13. The wireless power transmitting device according to claim 11, further comprising an impedance matching unit coupled with the power transmitter that includes at least one of a coil and a capacitor configured for impedance matching so that the power wirelessly transmitted has a high efficiency or a high power value.

14. The wireless power transmitting device according to claim 11, wherein the power transmitter is configured to supply power in a form of at least one of alternating Current (AC) waveforms, or convert power in direct current (DC) waveforms by an inverter to power in AC waveforms.

15. A wireless power transmitting device, comprising:
a housing;
a power transmitter arranged within the housing that includes:
a main substrate;
a coil unit arranged in the housing and electrically connected to the main substrate; and
a connection member that electrically couples the coil unit to the main substrate,
wherein the power transmitter wirelessly transmits power to one or more wireless power receivers according to an electromagnetic induction scheme.

16. The wireless power transmitting device according to claim 15, wherein a distance between the power transmitter and the at least one or more wireless power receivers is 10 cm or less.

* * * * *